April 23, 1974  F. TABAK  3,806,322
RECUPERATIVE FORM OF CATALYTIC-THERMAL INCINERATOR
Filed June 29, 1972  2 Sheets-Sheet 1

United States Patent Office 3,806,322
Patented Apr. 23, 1974

3,806,322
RECUPERATIVE FORM OF CATALYTIC-THERMAL INCINERATOR
Fernando Tabak, Queens, N.Y., assignor to Universal Oil Products Company, Des Plaines, Ill.
Filed June 29, 1972, Ser. No. 267,328
Int. Cl. F23g 7/06; B01j 19/04
U.S. Cl. 23—277 C      6 Claims

ABSTRACT OF THE DISCLOSURE

A special form of incinerator design provides for either a catalytic or thermal operation in that burner means is provided for initiating catalytic oxidation or for discharging hot combustion gases into an elongated central combustion section to oxidize the combustibles in the fume stream. A generally preferred recuperative form of unit provides for the heating of the contaminated gas stream entering by way of an annular heat exchange zone. The catalyst for effecting fume oxidation in the present unit is in a gas-pervious mat form positioned to encompass substantially 360° of a downstream portion of the inner annular partitioning wall between the inner section and the gas outlet or the annular heat exchange zone where preheating is provided, and additionally, there is utilized gas stream filtering means between the gas inlet-burner section and the catalyst section.

---

Figure 1:
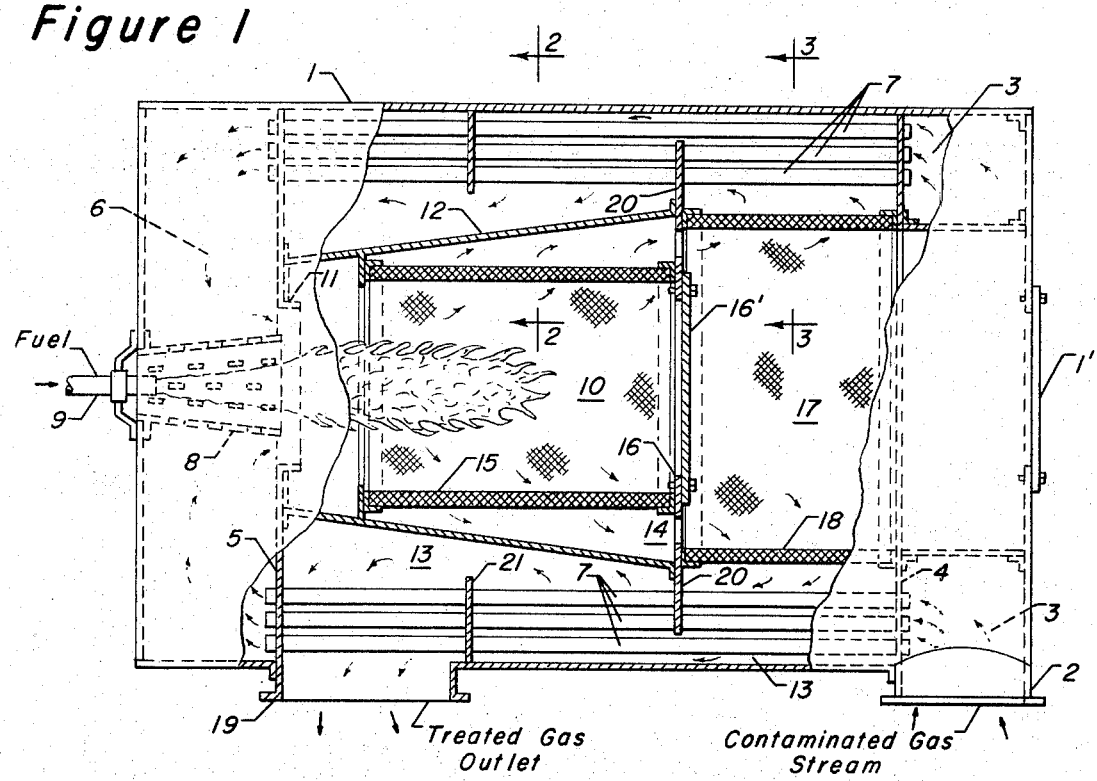

The present invention relates to a special form of fume incinerator which provides for either a thermal or catalytic type of operation and gas stream filtering between the burner and catalyst sections. An improved embodiment of the present invention also provides for a heat recuperative operation by having the incoming fume stream pass through an annular form heat exchange zone in heat exchange relationship with the resulting purified high temperature discharge stream.

It is recognized that many forms of thermal and catalytic incinerators have been designed and are in commercial usage to effect the oxidation and purification of noxious waste gas streams; however, the present design provides a compact and novel design and arrangement which permits the insertion, or removal, of catalyst elements to switch from one type of operation to the other. In fact, in the event that the catalyst operation for some reason fails to perform properly, the burner means can be readily operated at a sufficiently high temperature to have a thermal incinerator type operation, while the catalyst elements remain in place.

A preferred form of incineration unit will use a 100% secondary air burner, such that no primary air need be supplied, to thereby provide a high efficiency operation. As for the burner means and gas flow arrangement, the present design is somewhat related to that disclosed in my earlier application now issued as U.S. Pat. No. 3,549,333; however, in this instance, the inner cylindrical partitioning is comprised in part of a filtering section and gas pervious catalyst means such that a preheated gas stream can flow radially through the catalyst and be catalytically oxidized to remove noxious components. The catalyst may be a bed of impregnated refractory particles or pellets; a catalytic agent impregnated onto a "honeycomb" type ceramic support; or, preferably, will be of an all-metal construction such as may be provided by catalytically coated ribbon or wire in mat form between retaining screens.

Actually, it may be considered a principal object of the present invention to provide a heat recuperative, thermal-catalytic fume incinerator unit with burner means and catalyst elements being suitably placed such that the unit can readily operate either thermally or catalytically without any necessary modification.

It is a further object of the present invention to provide a fume incinerator unit with internal gas stream filter means to be used upstream from catalyst elements which are placed in an annular or cylindrical arrangement.

As still another object of the improved design, there is provided an arrangement where a gas stream filtering means is upstream in the inner partitioning so as to filter the gas stream after its passage through the burner section and a heat exchange section, if provided, as well as provide a greater length combustion section for reaping the benefits of time, temperature and turbulence in carrying out the fume incineration.

In a broad aspect, the present invention provides a thermal-catalytic fume incineration unit, which comprises in combination, an elongated outer housing, internal elongated cylindrical-form partitioning spaced inwardly from the wall of said housing, to provide annular space therebetween, a transverse partition across the interior of said cylindrical-form partitioning to provide an internal upstream burner section and a downstream fume oxidation section, burner means positioned at the end of said housing to discharge hot burner gases axially into said burner section, gas inlet means into said housing and to said burner section, gas stream filter means spaced in at least a portion of the upstream periphery of said cylindrical-form partitioning around said burner section, gas pervious catalyst means in at least a peripheral portion of the downstream section of said cylindrical-form partitioning, passageway means from said annular space around said filter means to one face of said catalyst means, and treated gas outlet mens from the opposing face of the latter and from said housing, whereby the gas stream to be incinerated and burner gases will pass radially to an upstream portion of said annular space inside of said housing and then radially through said catalyst means to said outlet means.

In a more specific aspect, the present invention provides a recuperative form of fume incineration unt, which comprises in combination, an elongated outer housing, an inner shell spaced from the outer housing and terminating short of one end of said housing to provide an external annular heat exchange section and a central gas distribution section, a transverse partition positioned across the internal end of said inner shell to provide a preheated gas inlet section in the end of said housing and an end closure for said annular heat exchange section, a burner means inserted into the end of said housing in the preheated gas inlet section and discharging into said central section, additional transverse partitioning that is positioned a spaced distance from the other end of said housing to provide a gas inlet section and a second end closure for said annular heat exchange section, a plurality of open-ended tubular members extending between and through said transversely positioned partitions to define inlet gas passageway means through said heat exchange section from said gas inlet section to said preheated gas section, open passageway means from the latter section to said central gas distribution section, gas permeable catalyst means positioned in a downstream portion of said inner shell to thereby permit catalyst-gas contact and gas flow into said heat exchange section from said central section, a gas stream inlet to said housing and to said gas inlet section, and a treated gas outlet from said heat exchange section and from said housing.

It may also be noted that a preferred form of the present incinerator unit will have a filtering section within the upstream portion of the internal partitioning such that there is means to filter the gas stream between the burner means and the catalytic section and preclude the collection of particulates on the face of the catalyst. It is also preferred that the filtering section and the catalyst section be in a substantially end-to-end arrangement so that the gas stream flows radially through the filtering section within an upstream portion of the internal partitioning means and the gas stream then flows longitudinally through a passageway or annular space so as to subsequently flow radially, either inwardly or outwardly, through the catalyst section to gas outlet means. In an embodiment which has an annular form heat exchange section for preheating the inlet gas stream, the internal gas stream flow will preferably be such as to flow radially outwardly through a substantially fully circumferential catalyst element or elements and then flow into an annular heat exchange zone in heat exchange relationship with the gas inlet passageway.

The filtering section may be made up of a cylindrical-form element, or a series of spaced elements around the wall of a cylindrical-form partitioning means and will, of course, be suitable for high temperature conditions. The actual filter media may comprise mesh of high temperature resistant metal or may comprise a mat of refractory fibers, such as drawn or spun alumina fibers, silica fibers, and the like. Preferably, the filter elements in the filtering section will be removable so as to be periodically replaced or cleaned to remove retained particulates from the gas stream.

As set forth briefly before, the catalyst elements or catalyst means may comprise an all-metal construction such as high temperature resistant wire or ribbon coated or plated with platinum, palladium, or other active metal, whereby there is an active oxidizing catalyst to effect the incineration of combustible fumes in the gas stream to be treated. Reference may be made to U.S. Pat. Nos. 2,658,-742 and 2,720,494. Alternatively, the catalyst section may comprise one or more elements utilizing coated refractory pills or other subdivided particles which have a catalytic coating suitable to effect the desired oxidation reactions. For example, spherical-form alumina particles may be impregnated or otherwise coated with a suitable oxidizing catalyst agent and such particles retained between gas perforate screens so that there is permeability for the radial inward or outward flow of the gas stream passing from the inlet and burner zones of the incinerator unit.

Reference to the accompanying drawing and the following description thereof will serve to illustrate various features and advantages of the present invention as well as point out specific aspects of construction to obtain the desired filtering and heat recuperation features.

FIG. 1 of the drawing is a longitudinal sectional elevational view of one embodiment of the present invention, indicating both filtering and heat recuperation with respect to incoming and outgoing gas streams.

Figure 2:
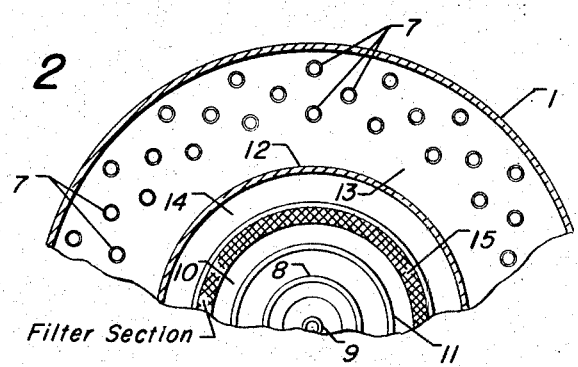
Figure 3:
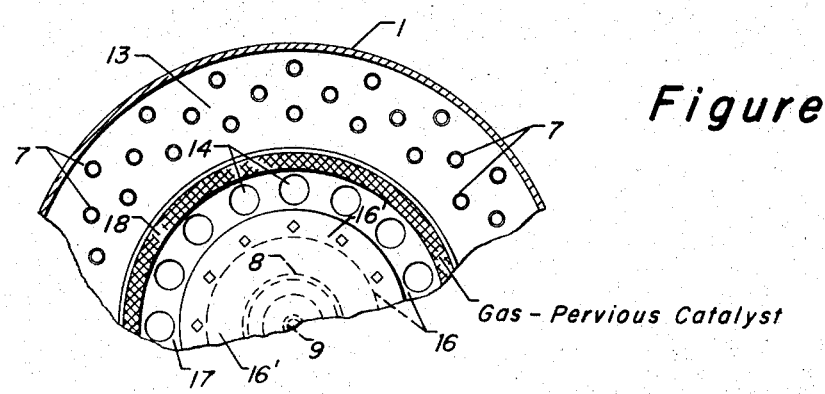

FIGS. 2 and 3 of the drawing show partial cross-sectional views, as indicated by the lines 2—2 and 3—3 in FIG. 1.

Figure 4:
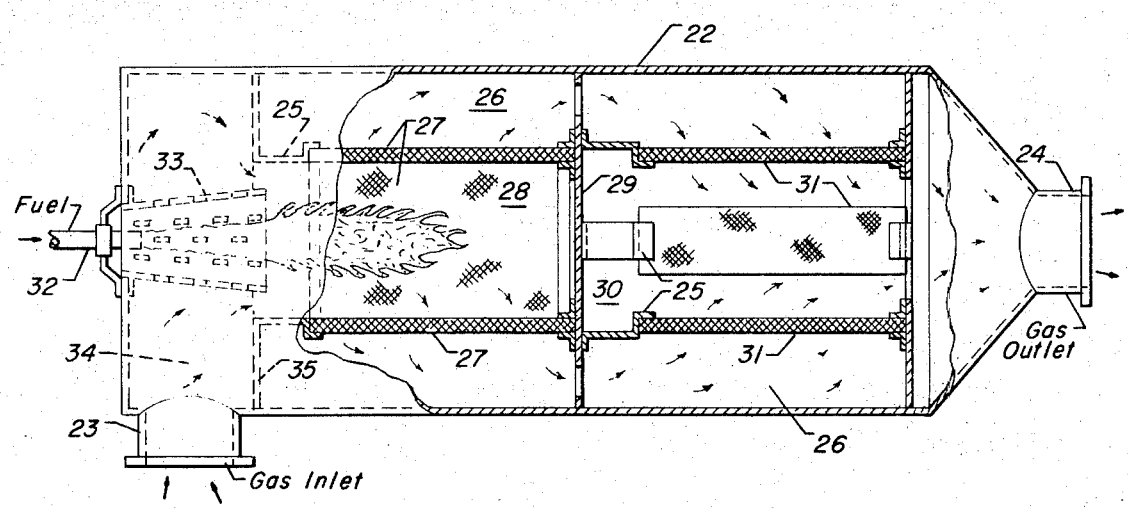

FIG. 4 of the drawing is a diagrammatic longitudinal sectional view indicating radial outward flow through an upstream filtering section and a radial inward flow through a downstream catalyst section, as well as the end-to-end arrangement for the filtering and catalyst sections in the incineartor unit.

Figure 5:
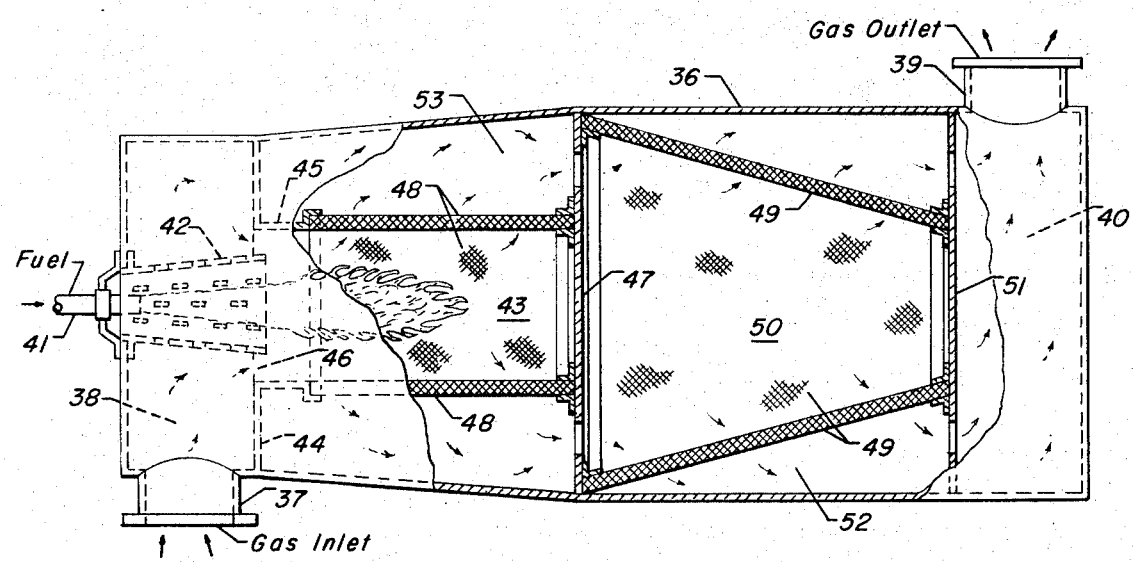

FIG. 5 of the drawing is also a longitudinal sectional view through an incinerator unit where there is radial outward flow through both the filtering and catalyst sections into encompassing annular gas passageway and collection zones.

Referring now particularly to FIGS. 1, 2 and 3 of the drawing, there is shown an outer shell or housing 1 arranged to have a contaminated gas stream inlet 2 connective with an internal gas distribution section 3, which, in turn, passes the stream to a heat exchange section hereinafter described. Positioned transversely across the housing 1 is a partition or tube sheet 4 which also defines one side of the distribution section 3, while at the other internal end of the housing there is a second transverse partition member 5 which serves as a tube sheet and along with the opposing end of the housing or chamber 1 defines a preheated gas distribution section 6. Extending between tube sheets 4 and 5 are a multiplicity of open-ended tubular members 7 which serve to pass the contaminated gas stream from section 3 into the section 6 for subsequent passage around the burner cone 8. Various types of burner means may be utilized in connection with the present form of incinerator unit; however, a preferred type of burner will be of the 100% secondary air type having only fuel introduced into the interior of burner cone means 8 through a line 9 and the air or oxygen required to sustain combustion will be supplied by way of the contaminated air stream entering the incinerator unit. Preferably, cone 8 will have a plurality of holes in order to permit air and gases into the interior thereof and mix with the fuel injected from line 9, as well as pass therearound and into the burning zone or central section 10. Although not shown, angular vanes or blades may be spaced in the annular opening between cone 8 and flange 11 of partition 5 such that a swirling motion is given to the preheated gas stream and improved mixing obtained with the flame and hot combustion gases in the central section 10. Suitable spark plug means or other ignition means may also be supplied in combination with the burner means in order to provide the initial start-up of an incinerator unit; however, it is not believed necessary to show such conventional ignition means in the present drawing.

In accordance with the present invention, an internal shell or cylindrical-form partitioning is provided at a spaced distance away from the inside of housing 1 such as provided by shell 12 and catalyst element(s) 18 defining an annular heat exchange section 13 and an internal gas passageway or downstream central section 17. As a part of the upstream partitioning, there is also indicated the use of a cylindrical-form filtering section 15 such that the hot combusion gases from burner means 8 and from the heated gas central section 10 will flow radially outwardly into a surrounding passageway 14 to then pass through transverse partitioning 16 and into the downstream central section 17 for radial outward flow through catalyst means 18 into the annular form heat exchange section 13. In the latter section, the hot catalytically treated gas stream will flow in a reverse direction around heat exchange tubes 7 to reach the treated gas stream outlet means 19. In order to assist the heat exchange flow of the hot gas stream, there is also indicated the utilization of spaced baffle means at 20 and 21 to provide an elongated, more torturous flow path from the catalyst section at 18 to the gas stream outlet at 19.

It will be noted that the filter section 15 as well as the catalyst section 18 are shown in a manner whereby there is a single filtering element 15 and a single catalyst element 18; however, it is to be understood that a plurality of filtering elements may be spaced longitudinally as well as circumferentially around the central burner section 10 to permit a generally outward radial flow of hot combustion gases to annular passageway means and, also, that the catalyst element 18 may comprise a plurality of sections in an end-to-end arrangement as well as in a circumferential arrangement so that there is also a generally outward radial flow from the downstream central section 17 over an entire 360°. In a minor modification, filtering elements and catalyst elements can be in a direct end-to-end relationship and there can be radial inward flow through catalyst elements 18 as long as there is a treated gas passageway from an inner zone to a gas outlet or to an outer annular zone, such as 13, whereby there may be the heat exchange flow with the contaminated gas stream entering distribution zone 3.

For convenience in obtaining access to the inner catalyst elements and filter elements, there may be suitable access door means such as 1' in the end portion of the housing 1 as well as removable door means 16' within transverse partitioning plate 16.

With particular reference to FIG. 4 of the drawing, there is indicated diagrammatically an elongated housing 22 with a gas inlet means 23 at one end and a gas outlet means 24 at the opposing end thereof. The present embodiment of the incinerator unit is to be utilized where the inlet gas stream is at a high temperature and it is believed unnecessary to provide heat exchange or heat recuperation with respect to the treated gas stream. However, in accordance with the present invention, there is inner cylindrical partitioning spaced from the outer shell or housing 22 which will accommodate the filtering and catalyst sections of the unit as well as provide annular form gas passageway means in the unit. Specifically, there is indicated an inner partition 25 spaced from housing 22 so as to provide an annular space 26 and the upstream section of such partition is, in turn, provided with one or more filtering sections 27 such that there is an outward radial flow of gases from a central burner section 28 into annular space 26. An intermediate transverse partition 29 extends across the interior of the incinerator to separate the burner section 28 from a central treated gas section 30 and preclude the incoming gas stream from flowing axially straight through the incinerator unit. The downstream portion of the cylindrical-form partitioning 25 is provided with gas permeable catalyst means 31 which, in turn, is between the central section 30 and gas passageway zone 26 whereby there is radial inward flow to section 30 an thence to gas outlet 24.

In a manner similar to the construction of FIG. 1, there may be a fuel inlet line 32 connective with the interior of a burner cone 33 such that there may be high temperature combustion gases in the heating or burner zone 28 to mix with the contaminated gas stream from inlet 23. Thus, in operation, the contaminated gas stream will flow into and around burner cone means 33 from an inlet section 34 defined by transverse partition 35 to flow through the central burner zone 28 and then pass radially outwardly through filter means 27 into annular passageway 26 to reach the downstream portion of the housing and the downstream catalyst section 31 where there is radial inward flow to the downstream central section 30 and to outlet means 24.

It is to be noted that the end-to-end arrangement for the filtering section 27 and the catalyst section 31 provides for an elongated path following the burner means at 33 such that when the unit is operating thermally, or non-catalytically, there is an elongated flow path for the gases to be in admixture with the hot burner gases and permit the three T's, i.e., time, temperature and turbulence, to effect optimum conversion of combustible components. Also, where the unit is to be operated catalytically, there is an elongated flow path, as well as filtering, ahead of the catalyst section whereby admixture with the hot combustion gases from burner 33 will cause the incoming gas stream to reach a catalyst ignition level. It may be further noted, as has been set forth in connection with FIG. 1, that the filtering section 27 may comprise one or more elements spaced longitudinally and peripherally around the partition 25 such that there is a generally outward radial flow through substantially 360° of the filtering means. Also, the catalyst 31 may be in one or more sections longitudinally and circumferentially within the downstream portion of partitioning means 25 so that there will be the general inward radial flow of the gas stream being treated in a central section 30 and thence to outlet 24. The gas outlet 24 may be axial as shown or alternatively form a side portion of the end gas collection section and from the housing.

In FIG. 5 of the drawing, there is a modification of the thermal-catalytic incinerator arrangement, as compared to FIG. 4 of the drawing, in that the downstream catalyst section is positioned so as to have an in-to-out flow for the gas stream being treated. Specifically, there is provided an outer housing 36 with a gas inlet means 37 connective with a gas distribution section 38 and a gas outlet 39 from a gas collection section 40 which is at the opposite end of the housing 36 with respect to the gas inlet section 38. Fuel is introduced by way of line 41 into burner means 42 so as to have the discharge of hot combustion gases into a central burner section 43. However, where desired, the burner means may be arranged other than axially as long as the hot combustion gases are baffled or otherwise channeled to flow into the central portion of the incinerator unit. A transverse partition 44 at the inlet end of the unit provides for defining gas distribution section 38 and such partition, together with a portion of longitudinal cylindrical-form partitioning 45, also provides an annular space 46 for the inward flow of the contaminated gas stream around burner means 42 and into heating zone 43. Additional transverse partitioning member 47 separates the upstream central burner section 43 and circumferential filtering means 48 from downstream catalyst elements 49 and a downstream gas distribution section 50. Still another transverse partition 51 separates the gas outlet section 40 from the gas distribution section 50 in order that there is required a radial outward gas flow through catalyst elements 49 into a passageway 52 and thence to gas collection zone 40.

In carrying out the catalytic incineration of a contaminated gas stream, the stream will enter inlet 37, pass through gas distribution zone 38, burner cone 42, as well as annular passageway 46, to be intermixed with the hot combustion gases in central zone 43 such that there is adequate preheating of the gas stream. The stream then passes through filtering means 48 into passageway 53 and then into distribution zone 50 for radial outward flow through catalyst elements 49 and into passageway 52 for collection in section 40 and discharge through outlet 39. The burner means 42 will merely have a fuel input which will effect the heating of the gas stream to an ignition temperature suitable for catalytic conversion within elements 49; however, in the event that the contaminated gas stream is at a high temperature, then burner means 42 and fuel supply thereto may be cut back or entirely eliminated to sustain the catalyst conversion.

In an alternative operation, where the catalyst elements are not to be utilized in the incinerator or may have become fouled from a long period of usage, then the burner means 42 can operate at a high temperature level to effect thermal conversion of all of the combustible components in the contaminated gas stream and the high temperature gas mixture of combustion gases and inlet gas stream will pass through filter means 48, passageway means 53 and 50, as well as collection zones 52 and 40, to reach the gas outlet 39 as a resulting treated gas stream with removed contaminants. As heretofore pointed out, it is desirable to have the upstream filter section 48 effect the removal of undesirable particles from the gas stream and preclude their deposition on the surface of the catalyst elements 49. It is also desirable to provide an end-to-end arrangement whereby there is a suitable time element for preheating or thermal conversion of the contaminated gas stream as it passes through the incinerator unit.

It is to be recognized that each of the drawings are merely diagrammatic and that various modifications may be made with respect to general shapes and configurations of housings and inlets or outlets, as well as with respect to modifications in partitioning and baffling to effect the desired end-to-end flow for the contaminated gas stream and a first stage radial flow through one or more filtering elements prior to having a radial flow through one or more catalyst elements. Also, it is not intended to limit the invention to any one method of supporting or positioning the one or more catalyst elements in combination with the internal cylinder-form partitioning means extending longitudinally to form the central portions of the incinerator housing. Still further, although not shown in any of the drawings, there may be suitable insulation provided around critical portions of the outer housing or around the heat exchange sections such that there may be an efficient retention of heat within the entire incinerator unit. All of the burner means have been indicated as 100% secondary air burners; however, other forms of burner means may be used within the scope of the present invention so long as there is a suitable location of the burner used to effect the proper mixing with the contaminated gas stream to be preheated or thermally converted at such times as the incinerator will be operating as a purely thermal incinerating device.

I claim as my invention:

1. A thermal-catalytic fume incineration unit, which comprises in combination, an elongated outer housing, internal elongated cylindrical-form partitioning spaced inwardly from the wall of said housing, to provide annular space therebetween, a transverse partition across the interior of said cylindrical-form partitioning to provide an internal upstream burner section and a downstream fume oxidation section, burner means positioned at the end of said housing to discharge hot burner gases axially into said burner section, gas inlet means into said housing and to said burner section, gas stream filter means spaced in at least a portion of the upstream periphery of said cylindrical-form partitioning around said burner section, gas pervious catalyst means in at least a peripheral portion of the downstream section of said cylindrical-form partitioning, passageway means from said annular space around said filter means to one face of said catalyst means, and treated gas outlet means from the opposing face of the latter and from said housing, whereby the gas stream to be incinerated and burner gases will pass radially to an upstream portion of said annular space inside of said housing and then radially through said catalyst means to said outlet means.

2. The fume incineration unit of claim 1 further characterized in that said gas stream to be incinerated passes to the upstream interior portion of the housing and passes radially outwardly through said filtering means to an upstream portion of said annular space and the latter extends longitudinally along the inside wall of said housing at a spaced distance around said catalyst means, whereby there is a resulting radial inward flow through the latter ahead of said gas outlet.

3. The fume incineration unit of claim 1 further characterized in that passageway means is provided from the upstream portion of said annular space inside of said housing which extends through said transverse partition to reach the central interior portion of said housing and an interior face of said catalyst means, whereby there is a resulting outward radial flow through the latter into a downstream portion of the annular space inside of said housing for the collection of treated gas and subsequent flow to said gas outlet means.

4. A recuperative form of fume incineration unit, which comprises in combination, an elongated outer housing, an inner shell spaced from the outer housing and terminating short of one end of said housing to provide an external annular heat exchange section and a central gas distribution section, a transverse partition positioned across the internal end of said inner shell to provide a preheated gas inlet section in the end of said housing and an end closure for said annular heat exchange section, a burner means inserted into the end of said housing in the preheated gas inlet section for discharge into said central section, additional transverse partitioning that is positioned a spaced distance from the other end of said housing to provide a gas inlet section and a second end closure for said annular heat exchange section, a plurality of open-ended tubular members extending between and through said transversely positioned partitions to define inlet gas passageway means through said heat exchange section from said gas inlet section to said preheated gas section, open passageway means from the latter section to said central gas distribution section, gas permeable catalyst means positioned in a downstream portion of said inner shell to thereby permit catalyst-gas contact and gas flow into said heat exchange section from said central section, a gas stream inlet to said housing and to said gas inlet section, and a treated gas outlet from said heat exchange section and from said housing.

5. The recuperative fume incineration unit of claim 4 further characterized in that filter means is provided in at least a portion of the upstream wall of said inner shell, whereby the preheated gas stream and hot burner gases pass radially outwardly through such filter means and then pass to said catalyst means.

6. The recuperative fume incineration unit of claim 4 further characterized in that said burner means is positioned to be axially inserted at the end of said housing to thereby discharge hot combustion gases axially into said central gas distribution section and an annular space is provided around said burner means and said inner shell defining said central gas distribution section whereby the preheated gas stream will primarily enter said central gas section in an annular stream around said axially positioned burner means.

References Cited
UNITED STATES PATENTS

| | | | |
|---|---|---|---|
| 3,090,675 | 5/1963 | Ruff et al. | 23—277 C |
| 3,251,656 | 5/1966 | Edwards | 23—277 C |
| 3,311,456 | 3/1967 | Denny et al. | 23—277 C |
| 3,468,634 | 9/1969 | Pauletta | 23—277 C X |
| 3,486,841 | 12/1969 | Betz | 23—288 F X |
| 3,607,118 | 9/1971 | Johnson | 23—277 C |
| 3,549,333 | 12/1970 | Tabak et al. | 23—284 X |

JAMES H. TAYMAN, JR., Primary Examiner

U.S. Cl. X.R.

23—284, 288 F; 110—8 A; 431—5; 423—210